United States Patent [19]
Coleman

[11] 3,937,009
[45] Feb. 10, 1976

[54] TORQUE-JET ENGINE

[76] Inventor: Howard Coleman, 1312 Briarcliff, Austin, Tex. 78723

[22] Filed: Sept. 24, 1974

[21] Appl. No.: 508,849

[52] U.S. Cl. .................. 60/39.35; 415/81; 416/21
[51] Int. Cl.² .......................................... F02C 3/16
[58] Field of Search .......... 60/39.35, 39.34; 415/80, 415/81; 416/21

[56] References Cited
UNITED STATES PATENTS

| | | | |
|---|---|---|---|
| 1,100,632 | 6/1914 | Tuch | 415/81 |
| 2,111,136 | 3/1938 | Bauer | 415/81 |
| 2,407,824 | 9/1946 | Fisher | 60/39.35 |
| 2,448,972 | 9/1948 | Gizara | 60/39.35 |
| 2,499,863 | 3/1950 | Hart | 60/39.35 |
| 2,508,673 | 5/1950 | Guthier | 60/39.35 X |
| 3,005,311 | 10/1961 | Ross | 60/39.35 |
| 3,077,075 | 2/1963 | Turanciol | 60/39.35 |
| 3,727,401 | 4/1973 | Fincher | 60/39.35 |

FOREIGN PATENTS OR APPLICATIONS

| | | | |
|---|---|---|---|
| 251,674 | 4/1926 | Italy | 415/81 |
| 934,755 | 1/1948 | France | 60/39.35 |
| 1,223,999 | 3/1971 | United Kingdom | 60/39.35 |

*Primary Examiner*—Carlton R. Croyle
*Assistant Examiner*—Robert E. Garrett
*Attorney, Agent, or Firm*—Allan Redrow

[57] ABSTRACT

A rotary internal combustion engine is shown having a combination of reaction nozzle means and turbine elements to extract energy from a stream of hot gases. A centrifugal air compressor feeds a rotary diffusion combustion chamber to operate the reaction nozzles. The products of combustion issuing from the nozzles are redirected by stationary vanes to drive a turbine to extract further energy from the gas flow as it passes to the exhaust.

15 Claims, 2 Drawing Figures

TORQUE-JET ENGINE

BACKGROUND

Various designs have been proposed heretofore for making use of the products of combustion in an internal combustion engine for driving gas actuated reaction nozzles that are adapted to drive a rotary means connected to a power shaft. Typical examples of such engines are shown in the U.S. Patent Nos. granted to: Fisher 2,407,824 issued Sept. 17, 1946, Cooke 2,439,717 issued Apr. 13, 1948, Goddard 2,544,418 issued Mar. 6, 1951, Paradiso 2,914,920 issued Dec. 1, 1959, Wormser 3,118,277 issued Jan. 21, 1964, and Warren et al, 3,287,904 issued Nov. 29, 1966.

BRIEF DESCRIPTION OF THIS INVENTION

The present invention provides an improvement on these known engines in providing a rotating centrifugal compressor for feeding air in a streamlined direction into a rotating combustion chamber means. Fuel is added to the compressed gas and an elongated rotating combustion chamber contains the mixture while fuel combustion is being completed. The gases continue to move outwardly in a streamlined path until combustion is completed and then the fully combusted fuel and mixed gases issue in a high velocity stream directly from the combustion chamber through reaction nozzles at the outer periphery of the combustion chamber to impinge against fixed deflector blades arranged in a circle around the outside of the rotary path of the nozzles. The fixed blades turn or redirect the high velocity stream to direct the gas flow through cooperating turbine means concentrically arranged around these blades to extract additional energy from the power stream of hot gases. The design provides for a continuously outwardly moving gas stream from the central intake through the compressor, the combustion chamber, the turbine and into the exhaust.

The combined rotating compressor and combustion chamber design accomplishes a most efficient movement of the gas stream through the engine while retaining the fuel, air and the resulting products of combustion in the combustion chamber until the most efficient burning of all of the fuel has been accomplished, with a minimum production of undesired exhaust components that might be harmful if exhausted into the atmosphere.

It is therefore, an object of the invention to provide a rotary turbine gas actuated engine designed to exert a maximum jet thrust for conversion to usable torque.

It is another object of this invention to provide an engine adapted to extract a maximum amount of work from a given amount of fuel.

It is another object of this invention to provide a turbine engine having a centrifugal gas flow from inlet, through a compressor and rotary combustion chamber for driving a turbine.

It is another object of the invention to control combustion of a fuel in a manner to minimize the production of pollutants to be found in the exhaust.

Another object is to provide a rotary engine structure adapted to extract the maximum thrust from a gas stream for conversion to torque at the drive shaft.

It is another object to provide an arrangement of reaction nozzle means driven by a gas stream coupled with deflector vanes and turbine means all arranged concentrically to extract the maximum thrust from a gas stream for conversion to torque at the drive shaft.

Another object of the invention is to provide a simplified design of jet driven turbine engine.

Another object is to provide an engine of light weight but rugged design.

It is another object of this invention to provide an efficient combustion cycle embodied in an engine having a simplified, light weight, and low maintenance structure.

It is another object of this invention to provide a unique engine design having a rotary combustion chamber, gas jet, stator blade and combined turbine structure.

A still further object is to provide an engine having an efficient operating cycle and a wide range of adaptability.

These and other objects will appear more fully in the description below.

IN THE DRAWINGS

DETAILED DESCRIPTION

Figure 1:
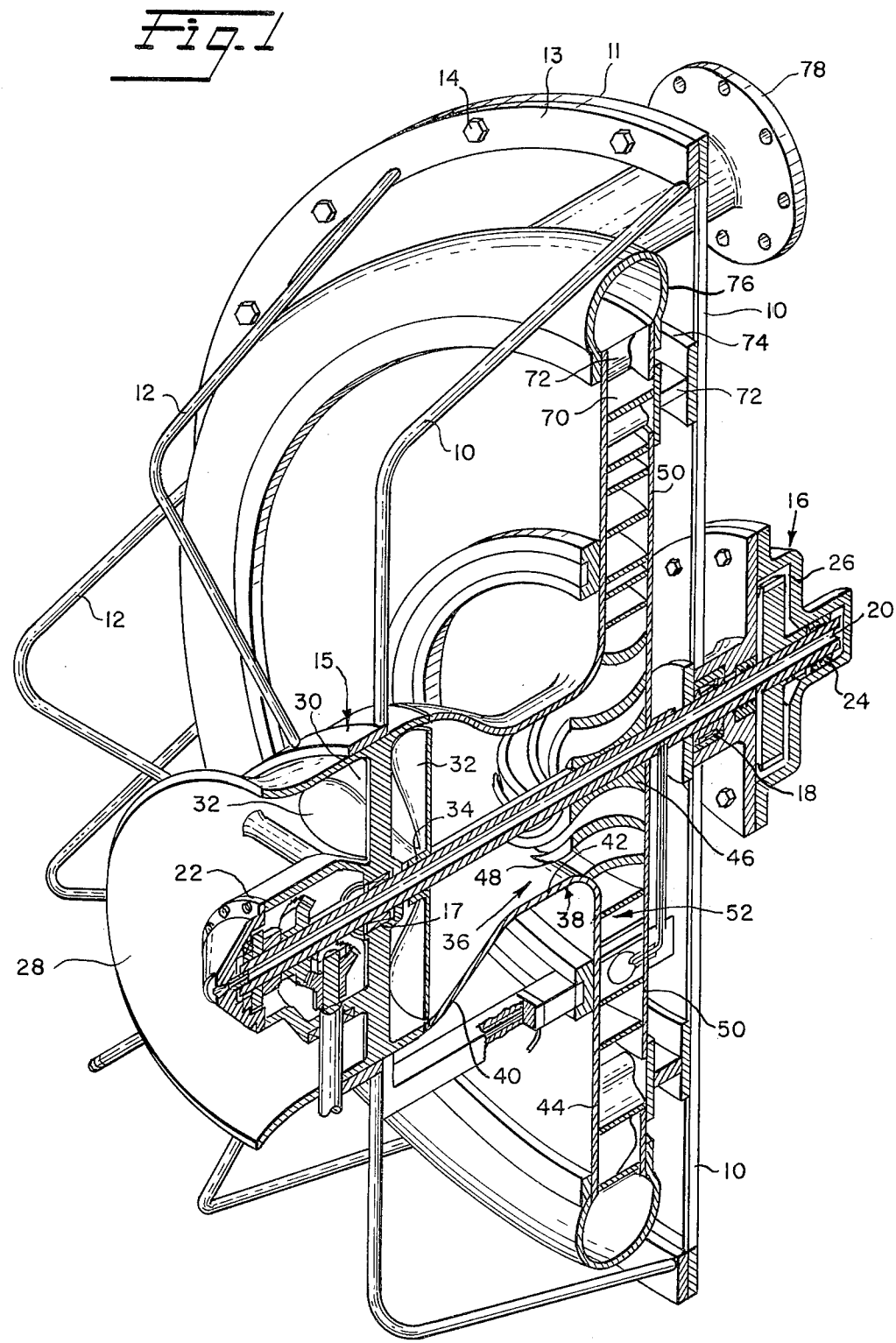
FIG. 1 is a diagrammatic perspective view of my engine assembly.

An assembly view of the internal combustion engine of this invention is shown in FIG. 1. It includes an air compressor, combustion chamber, reaction jet drive means and a turbine drive to extract energy from the fuel. The air is fed from one end of the engine into a centrifugal compressor which in turn delivers the air into a rotary combustion chamber or diffuser, the products of combustion issue from the jets on the periphery of the diffuser to be directed by stationary blades into turbine blades. The compressor and diffuser are arranged concentrically on a drive shaft as will appear more fully below.

The engine is carried in a two part frame composed in one part of rigid spokes 10 and a circular flange 11 and a second section composed of spokes 12 and a circular flange 13. Flanges 11 and 13 are adapted to be integrally assembled together by bolts 14. The assembled frame is designed to support spaced apart inlet housing 15 and the rear power take-off housing 16 in fixed alignment. The separate housings 15 and 16 support aligned bearing means 17 and 18 respectively which in turn carry the hollow rotating main shaft 20 of the engine.

At the front or air intake end of the engine the shaft 20 extends into the center of the housing 15, through the bearing 17 carried in the inlet housing and into a forward drive compartment 22 that incloses a power take off drive for any auxiliary equipment such as fuel pump, oil pump or other usual means, not shown, that may desirably be associated with engines such as here disclosed. At its opposite end the shaft 20 is generally centrally disposed in housing 16 to rotate in bearings 18 and 24. A main power take off gear 26 is contained within housing 16 and is keyed to the shaft 20.

The housing 15 at the front end of the engine has an integral bell shaped mouth 28 leading into a passage 30 to deliver air to the compressor for the engine. At the throat of housing 15, a fan 32 is provided, the fan including a plurality of blades carried on a hub 34 keyed to shaft 20. The fan blades assist in moving air through passage 30 into the converging inlet passage 36 within the rotating housing 38 leading to the air compressor means.

The housing 38 is formed to have a bell shaped inlet section 40 leading to a throat 42 and behind the throat, the housing has an integral front wall 44 forming one wall of the compressor and combustion chamber elements. The housing 38 has a central hub 46 keyed to shaft 20 and the hub supports a series of spiral compressor blades 48 that extend lengthwise throughout the entire throat 42 and are concentrically arranged on shaft 20. Hub 46 is also integrally connected to a rear wall 50 of the housing that encloses blades 48 wall 50 being spaced apart from wall 44 to provide an internal space for confining the compressor and combustion chamber means.

Figure 2:
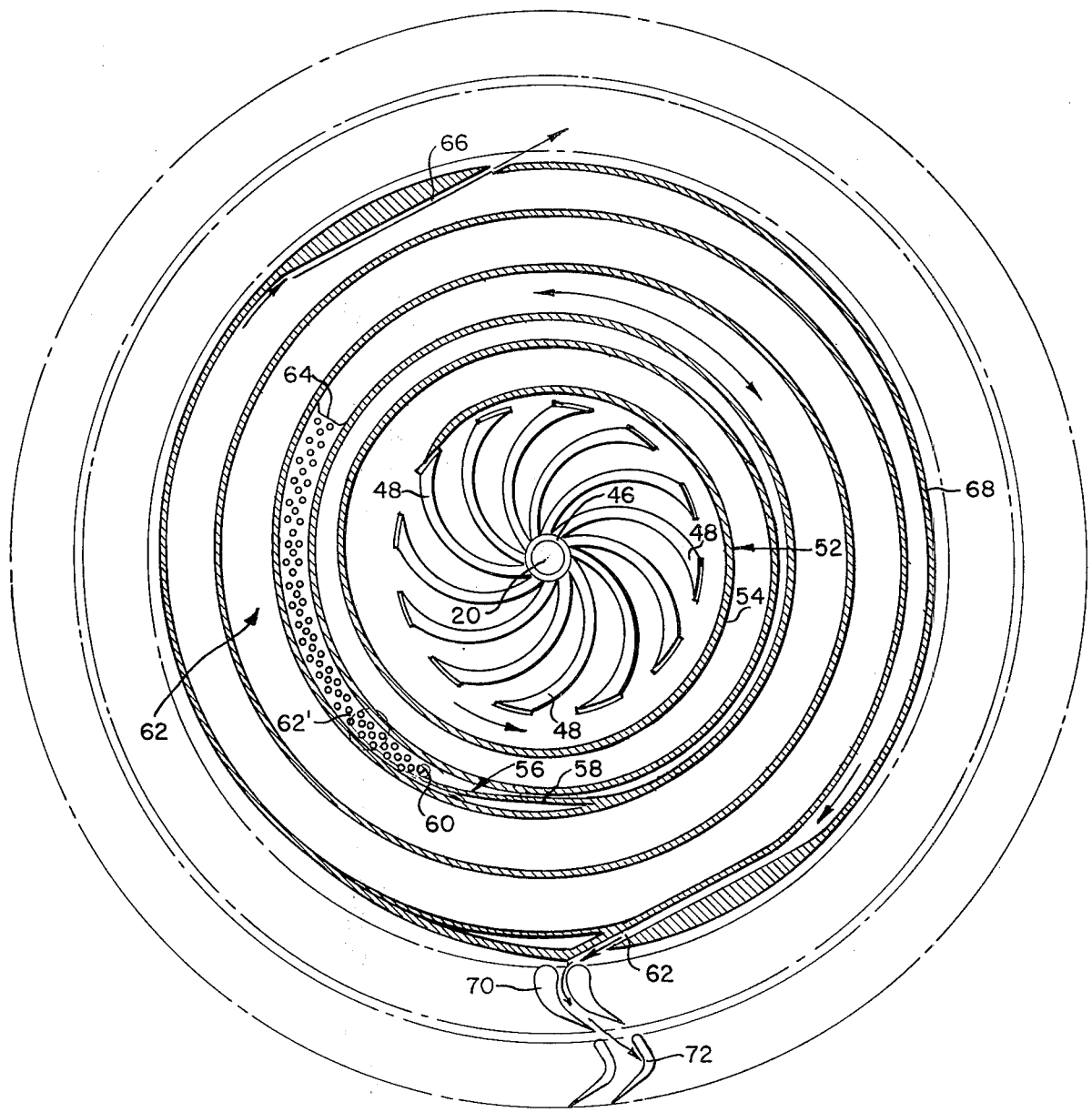
FIG. 2 is a front elevation showing the compressor and combustion chamber assembly of this invention.

The air compressing means associated with this engine includes the bell shaped entrance 28 that may be driven at a more or less high velocity into the atmosphere to collect air that is moved on by fan blades 32 into the converging throat 42 of housing 38. The spiral compressor blades 48 then engage the air to move it through the throat and drive it outwardly into the final stage of the compressor means shown in FIG. 2. This stage includes a single converging spiral passage 52 that receives the somewhat compressed air flowing from the outer periphery of spiral vanes 48. The passage 52 is defined by the wall 54 that extends across the space between walls 44 and 50. As best seen in FIG. 2, one end of wall 54 is formed adjacent to or may be integral with an end of one of the vanes 48 and gradually diverges therefrom as shown in FIG. 2. The several convolutions of the single wall 54 forming the passage 52 are supported from walls 44 and 50 to define an air passage having a converging pattern whereby the air is further compressed as it is moved by the vanes 48 toward and over their rear ends to flow outwardly by centrifugal force through passage 52. The air flow is compressed as the engine revolves and the air moves through several revolutions of the converging passage until it reaches the outlet 56 from the compressor passage 52. The outlet is formed by a continuation of wall 54 together with an added baffle wall 58 positioned between different portions of wall 54 in one of the convolutions. As shown in FIG. 2, the throat 56 is positioned in the second complete convolution from the inlet to passage 52.

The compressed air issuing from throat 56 flows into the combustion chamber that is defined by walls 44 & 50 and the succeeding convolutions of wall 54. Just after the compressed air flows from throat 56, fuel is injected into the air stream by injector 60. The fuel air mixture normally maintains a continuous flame in the initial stages of the expanding passage 62. The combustion chamber 62 is designed to be of a length to allow relatively gradual expansion of the resulting gases as combustion of the fuel in the air takes place, the combustion being completed in a time period and at such a rate as to allow for complete oxidation of the fuel in the most efficient manner. By providing the several diverging convolutions of wall 54 forming the combustion chamber as shown in FIG. 2, complete combustion of a fuel such as kerosene, for example, can be completed at a temperature of 1540°F without the undue production of any unwanted chemical products that might otherwise pollute the atmosphere when finally exhausted from the engine. The combustion chamber is provided with a glow plug or other igniter 62' that is activated upon start up of the engine and whenever needed otherwise, if there should be an unexpected flame-out.

The initial combustion stages take place in a fuel air mixer 64 and when combustion is well started, the burning components in the gas stream flow into the gradually expanding passage 62 and on to the plurality of outlet jets 66 disposed around the outer periphery 68 of combustion chamber. The combustion gases issue from jets 66 disposed at 90° to a radius drawn through the axis of shaft 20 about which the housing 38, compressor, and combustion chamber rotate, whereby a maximum thrust component is generated by the reaction to this high velocity gas flow.

As the working gas stream issues from the jets 66, the several jet streams impinge upon a series of fixed vanes 70 which turn the streams to redirect them into a series of turbine blades 72. The fixed blades or stators 70 are arranged close to and concentrically around the periphery 68 of the combustion chamber. The stators are supported integral with spokes 10 on pedestals 72, the stators being supported in a cantilever manner from one end to be positioned between jets 66 and turbine blades 72. The turbine blades 72 are formed integral with wall 44 of housing 38 whereby the blades 72 are driven to add their power to the action of jets 66 that also drive shaft 20 through wall 44 and wall 50.

The gases flowing through the turbine blades 72 are confined by wall 74 integral with the rear ends of the turbine blades, the wall 74 providing in effect an extension of wall 50 and the forward end of pedestal 72, to confine the products of combustion. The exhaust gases from the turbine are collected in a manifold 76 to be exhausted to the atmosphere, or elsewhere through outlet 78.

It will be noted that the structure described above provides an engine for compressing air to be fed to a combustion cycle in which all of the air, fuel, and products of combustion flow centrifugally through a rotary system. The path the gases travel is substantially one continuous spiral whereby a most efficient flow principle is followed. The compressor is coupled to a rotary diffuser combustion chamber having a long path for completing the oxidation reaction before the work is extracted from the high velocity gas streams. As stated above, this burning action together with the elimination of a continuously intermittently sparking igniter such as the spark plug of a piston engine, provides an apparatus that makes possible a substantially pollution free burning cycle and one which makes possible the use of kereosene and other fuels that can be extracted from petroleum crudes in greater quantity than the lighter fractions that must be provided for the known piston automotive engines used almost universally today for automotive applications.

The structure makes use of the restrictive exhaust jets 66 disposed at 90° to the radius of rotation to issue jet streams relatively free of eddy currents whereby the maximum thrust of the gases issuing through the jets is recovered. Recovery of the residual energy in the flowing high velocity stream is obtained by redirecting the gas stream through stators 70 for impingement on turbine blades 72. This arrangement of the concentric positioning of the stators around the periphery of the combustion chamber and jets 66 continues the straight forward outward flow of the entire gas stream whereby the most efficient flow pattern is provided for accomplishing a maximum production of energy in the gas stream.

The centrally disposed compressor blades 48 are designed to pick up the inflowing air stream that has been slightly compressed during its flow into the engine from the inlet 28. The compressor blades 48 engage the air stream and cause it to be further compressed and change direction to flow outwardly from the axis of shaft 20 into the centrifugal compressor and the combustion chamber. The air and ultimately the fuel and combustion products continue onwardly in the enclosed combustion chamber 62 as described above. The diffuser combustor allows for the maintenance of a continuous flame to maximize energy production with the production of a minimum or negligible volume of pollutants. The elimination of a continuously firing spark plug as used in a piston engine, contributes substantially to the elimination of nearly all objectionable nitrogen oxide components in the combustion gases.

The operation of this engine is apparent from the description above. Once rotary motion has been started as with a starter motor, not shown, and ignition takes place, the gas flow accelerates through the rotating diffuser combustion chamber to issue as a power jet stream from the reaction outlet jets 66. This action drives the housing 38 keyed to shaft 20 to rotate about the axis of the shaft. Once ignition takes place, the igniter may be deactivated and the continuous flame produces the high velocity gas stream from which the energy is extracted to drive shaft 20, the compressor, combustion chamber, and turbine, in order to provide energy for driving such equipment as may be connected to power take off 26.

The various elements of this machine are designed for light weight and the frame members 10, 11, 12 and 13 support all of the structure. This quite simple support makes it possible to very easily service the mechanism. It should also be noted that the walls 44 and 50 which enclose the combustion chamber, are fully exposed and are air cooled so that available steel alloys may be used for fabrication of the engine. This engine will be found to be light weight, durable and easy to maintain.

It is apparent that known forms of seals may be used where necessary to assist in confining the high velocity gas stream to cause it to all flow through the turbine blades. Also, the fuel feed system may include connections to feed fuel into the hollow shaft 20 for eventual delivery to the fuel injector 60 in a known manner. The design will require a minimum of lubrication and no lubrication in any area involving the combustion chamber.

The above description covers the preferred form of my engine and it is possible that many modifications thereof may occur to those skilled in the art that will fall within the scope of the following claims.

I claim:

1. A rotary internal combustion reaction engine having air inlet, fuel injection means and an exhaust outlet for the products of combustion produced in the engine comprising a rotating air compressing means for receiving air from said inlet, said compressing means having a passage extending around at least 360° in the direction of its rotation, a rotating combustion chamber integral with and concentrically disposed with respect to said compressing means, said combustion chamber having an infeed throat at its inner end to receive compressed air from said compressor, said combustion chamber extending outwardly, from said throat, fuel injection means at said throat to feed fuel into the combustion chamber, igniter means at said throat to initiate combustion of the fuel and air at said throat, a common wall means for defining a portion of said compressing means and said combustion chamber to provide for a heat exchange between the infeeding compressed air and heat from the combustion chamber, reaction nozzle means near the outer end of the combustion chamber and rotating therewith forming an exhaust means for allowing the products of combustion to issue from the combustion chamber whereby to drive said compressing and combustion chamber means to rotate about a common axis, fixed frame means for supporting said air compressing and combustion means, fixed deflector blades carried on said frame concentrically with respect to said axis and said reaction nozzle means to redirect the flow of exhaust gases issuing from said nozzle means, turbine means disposed concentrically outside of said deflector blades to be driven by the exhaust gas flowing from said combustion chamber, and rotating driven means operatively connected to said reaction nozzle means and said turbine means to deliver power from the engine.

2. An engine as in claim 1 wherein said air compressing means and said combustion chamber are serially arranged in different portions respectively of a continuous spiral path.

3. An engine as in claim 2 wherein the combustion chamber is an elongated passage.

4. An engine as in claim 2 wherein the flow of exhaust gases issues from the nozzle means in a direction at right angles to a radius through said axis.

5. An engine as in claim 4 wherein said combustion chamber has a closed outer wall forming a periphery and said nozzle means extend through said periphery.

6. An engine as in claim 5 wherein said deflector blades are cantilever supported means extending in a direction parallel to said axis from said frame means to be positioned between said nozzle and turbine means.

7. An engine as in claim 6 wherein said frame includes a stationary frame means extending at right angles to said common axis and said compressor and combustion chamber are confined between a pair of rotating spaced apart walls each disposed at right angles to said common axis, and said rotating walls define opposite side walls of said comopressor and combustion chamber means.

8. An engine as in claim 7 wherein said engine includes a rotating drive shaft, bearing means on said frame means for rotatably supporting said shaft, and said rotating walls being fixedly supported on said shaft.

9. An engine as in claim 8 wherein the inlet includes a rotating mouth element forming bell shaped passage, fan shaped spokes for integrally supporting said mouth element on said shaft, an entrance from said passage into said inlet to the compressor means, and spirally shaped deflector blades surrounding said entrance to compress and deliver infeed air into the compressor.

10. An engine as in claim 2 wherein said compressor includes a widened entrance portion to said spiral path and the combustion chamber has a narrowed path at the throat thereof.

11. An engine as in claim 10 wherein the portion of said path forming the combustion chamber expands between said narrowed throat and said nozzle means.

12. An engine as in claim 1 wherein said inlet includes a fixed bell shaped member positioned in front of a smaller rotating bell shaped member, said fixed bell shaped member being supported integrally with said fixed frame and said rotating member is integral with said compressor.

13. A structure as in claim 1 wherein said fixed frame includes spaced apart bearing means for supporting said rotating compressing and combustion means, and said deflector blades are supported on spokes radiating from one of said bearing means.

14. A structure as in claim 13 wherein said inlet includes a fixed bell shaped element for directing air into said compressing means, said bell shaped element being integral with the other of said bearing means.

15. A structure as in claim 14 wherein said bell shaped element is supported on said other bearing and a flange that is removably attached to said spokes.

* * * * *